US012169319B2

(12) United States Patent
Ye

(10) Patent No.: US 12,169,319 B2
(45) Date of Patent: *Dec. 17, 2024

(54) PATCH PANEL WITH LIFTING CASSETTE REMOVAL

(71) Applicant: AFL Telecommunications LLC, Duncan, SC (US)

(72) Inventor: Zidi Ye, Shenzhen (CN)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,378

(22) Filed: Jun. 23, 2023

(65) Prior Publication Data

US 2023/0333344 A1 Oct. 19, 2023

Related U.S. Application Data

(63) Continuation of application No. 17/568,651, filed on Jan. 4, 2022, now Pat. No. 11,726,288, which is a continuation of application No. 16/628,478, filed as application No. PCT/US2019/027892 on Apr. 17, 2019, now Pat. No. 11,237,348.

(51) Int. Cl.
*G02B 6/44* (2006.01)
(52) U.S. Cl.
CPC ......... *G02B 6/4455* (2013.01); *G02B 6/4452* (2013.01)
(58) Field of Classification Search
CPC ........................................ G02B 6/4453–4455
See application file for complete search history.

(56) References Cited

U.S. PATENT DOCUMENTS

| 4,900,123 A | 2/1990 | Barlow et al. |
| 5,339,379 A | 8/1994 | Kutsch et al. |
| 5,490,229 A | 2/1996 | Ghandeharizadeh et al. |
| 5,701,380 A | 12/1997 | Larson et al. |
| 5,754,723 A | 5/1998 | Fremgen |
| 5,966,492 A | 10/1999 | Bechamps et al. |

(Continued)

FOREIGN PATENT DOCUMENTS

| AU | 2017204601 A1 | 7/2017 |
| CA | 2913141 A1 | 11/2014 |

(Continued)

OTHER PUBLICATIONS

European Search Report Corresponding to EP23175576 on Sep. 18, 2023.

(Continued)

*Primary Examiner* — Michael Stahl
(74) *Attorney, Agent, or Firm* — Dority & Manning, P.A.

(57) ABSTRACT

A patch panel includes a cabinet and a cassette. A pair of cassette guides is positioned within the cabinet. The pair of cassette guides are spaced along a lateral direction such that the cassette is receivable between the pair of cassette guides. The cassette is slidable along a transverse direction on the pair of cassette guides. At least one of the pair of cassette guides includes a first rail and a second rail that are spaced apart along a vertical direction. The cassette is slidable along the transverse direction between the first and second rails. Each end of the first rail is cantilevered such that each end of the first rail is moveable along the vertical direction.

20 Claims, 10 Drawing Sheets

(56) References Cited

U.S. PATENT DOCUMENTS

| | | |
|---|---|---|
| 5,978,540 A | 11/1999 | Bechamps et al. |
| 6,215,938 B1 | 4/2001 | Reitmeier et al. |
| 6,456,773 B1 | 9/2002 | Keys |
| 6,499,609 B2 | 12/2002 | Patriche et al. |
| 6,647,197 B1 | 11/2003 | Marrs et al. |
| 6,677,520 B1 | 1/2004 | Kim et al. |
| 6,768,860 B2 | 7/2004 | Liberty |
| 6,792,190 B2 | 9/2004 | Xin et al. |
| 6,944,387 B2 | 9/2005 | Howell et al. |
| 6,944,389 B2 | 9/2005 | Giraud et al. |
| 7,391,952 B1 | 6/2008 | Ugolini et al. |
| 7,428,363 B2 | 9/2008 | Leon et al. |
| 7,509,015 B2 | 3/2009 | Murano |
| 7,689,089 B2 | 3/2010 | Wagner et al. |
| 7,697,811 B2 | 4/2010 | Murano et al. |
| 7,711,233 B2 | 5/2010 | MaHoney |
| 7,856,166 B2 | 12/2010 | Biribuze et al. |
| 7,889,961 B2 | 2/2011 | Cote et al. |
| 7,945,135 B2 | 5/2011 | Cooke et al. |
| 7,962,000 B2 | 6/2011 | Wagner et al. |
| 7,974,509 B2 | 7/2011 | Smith et al. |
| 8,184,938 B2 | 5/2012 | Cooke et al. |
| 8,208,781 B1 | 6/2012 | Morgan et al. |
| 8,229,268 B2 | 7/2012 | Krampotich et al. |
| 8,249,410 B2 | 8/2012 | Andrus et al. |
| 8,280,216 B2 | 10/2012 | Cooke et al. |
| 8,326,107 B2 | 12/2012 | Cooke et al. |
| 8,331,752 B2 | 12/2012 | Biribuze et al. |
| 8,346,046 B2 | 1/2013 | Wagner et al. |
| 8,385,710 B2 | 2/2013 | Wong et al. |
| 8,385,711 B2 | 2/2013 | Fabrykowski et al. |
| 8,433,063 B2 | 4/2013 | Murano et al. |
| 8,433,171 B2 | 4/2013 | Cooke et al. |
| 8,452,148 B2 | 5/2013 | Cooke et al. |
| 8,538,226 B2 | 9/2013 | Makrides-Saravanos et al. |
| 8,625,950 B2 | 1/2014 | Beamon et al. |
| 8,666,217 B2 | 3/2014 | Wong et al. |
| 8,705,926 B2 | 4/2014 | Giraud et al. |
| 8,712,206 B2 | 4/2014 | Cooke et al. |
| 8,814,445 B2 | 8/2014 | Gallegos et al. |
| 8,861,918 B2 | 10/2014 | Vazquez et al. |
| 8,879,882 B2 | 11/2014 | Conner et al. |
| 8,965,168 B2 | 2/2015 | Cowen et al. |
| 8,995,136 B2 | 3/2015 | Kostecka et al. |
| 9,002,166 B2 | 4/2015 | Solheid et al. |
| 9,020,319 B2 | 4/2015 | Anderson et al. |
| 9,075,217 B2 | 7/2015 | Giraud et al. |
| 9,116,324 B2 | 8/2015 | Cooke et al. |
| 9,167,897 B2 | 10/2015 | Barnes et al. |
| 9,182,563 B2 | 11/2015 | Badar et al. |
| 9,223,105 B2 | 12/2015 | Anderson et al. |
| 9,236,691 B2 | 1/2016 | Bragg |
| 9,250,409 B2 | 2/2016 | Blackwell, Jr. et al. |
| 9,372,318 B2 | 6/2016 | Veatch et al. |
| 9,423,585 B2 | 8/2016 | Timmins et al. |
| 9,435,975 B2 | 9/2016 | Ott |
| 9,442,265 B2 | 9/2016 | Hill et al. |
| 9,442,267 B2 | 9/2016 | Douglas et al. |
| 9,494,758 B2 | 11/2016 | Holmberg et al. |
| 9,516,781 B2 | 12/2016 | Ray |
| 9,519,118 B2 | 12/2016 | Giraud et al. |
| 9,523,833 B2 | 12/2016 | Campbell et al. |
| 9,532,482 B2 | 12/2016 | Anderson et al. |
| 9,541,725 B2 | 1/2017 | Holmberg et al. |
| 9,541,726 B2 | 1/2017 | Geens et al. |
| 9,568,699 B2 | 2/2017 | Geens et al. |
| 9,575,275 B2 | 2/2017 | Blackwell, Jr. et al. |
| 9,575,276 B2 | 2/2017 | Ruiz |
| 9,599,785 B2 | 3/2017 | Xu et al. |
| 9,625,668 B2 | 4/2017 | Xu et al. |
| 9,632,270 B2 | 4/2017 | Giraud et al. |
| 9,664,870 B2 | 5/2017 | Trebesch et al. |
| 9,664,871 B1 | 5/2017 | Galvan Mijangos et al. |
| 9,666,999 B2 | 5/2017 | Seo et al. |
| 9,678,295 B2 | 6/2017 | Giraud et al. |
| 9,678,296 B2 | 6/2017 | Krampotich et al. |
| 9,684,143 B2 | 6/2017 | Chen et al. |
| 9,690,064 B2 | 6/2017 | Sauter et al. |
| 9,690,065 B2 | 6/2017 | Wiltjer et al. |
| 9,709,764 B2 | 7/2017 | Smrha et al. |
| 9,709,765 B2 | 7/2017 | Wells et al. |
| 9,715,075 B2 | 7/2017 | Solheid et al. |
| 9,720,196 B2 | 8/2017 | Womack |
| 9,720,199 B2 | 8/2017 | Mead |
| 9,910,236 B2 | 3/2018 | Cooke et al. |
| 10,094,996 B2 | 10/2018 | Cooke et al. |
| 10,120,153 B2 | 11/2018 | Cooke et al. |
| 10,126,514 B2 | 11/2018 | Cooke et al. |
| 10,254,497 B2 | 4/2019 | Patel et al. |
| 10,261,281 B2 | 4/2019 | Geens et al. |
| 11,237,348 B2 | 2/2022 | Ye |
| 11,726,288 B2 * | 8/2023 | Ye .................. H04Q 1/023 385/135 |
| 2003/0117928 A1 | 6/2003 | Choi et al. |
| 2008/0089656 A1 | 4/2008 | Wagner et al. |
| 2012/0288249 A1 | 11/2012 | Ruiz |
| 2013/0163944 A1 | 6/2013 | Krampotich |
| 2013/0308916 A1 | 11/2013 | Buff et al. |
| 2014/0348467 A1 | 11/2014 | Cote et al. |
| 2015/0185429 A1 | 7/2015 | Cooke et al. |
| 2015/0212286 A1 | 7/2015 | Vongseng et al. |
| 2015/0316737 A1 | 11/2015 | McPhil Giraud et al. |
| 2016/0062058 A1 | 3/2016 | Dagley et al. |
| 2016/0109672 A1 | 4/2016 | Geens et al. |
| 2016/0147029 A1 | 5/2016 | Blackwell, Jr. et al. |
| 2016/0231525 A1 | 8/2016 | Murray et al. |
| 2016/0259129 A1 | 9/2016 | Geens et al. |
| 2016/0299308 A1 | 10/2016 | Wiltjer et al. |
| 2016/0313525 A1 | 10/2016 | Fletcher et al. |
| 2017/0010432 A1 | 1/2017 | Xu et al. |
| 2017/0082815 A1 | 3/2017 | Takeuchi et al. |
| 2017/0131500 A1 | 5/2017 | Sauter et al. |
| 2017/0131501 A1 | 5/2017 | Solheid et al. |
| 2017/0131505 A1 | 5/2017 | Cooke et al. |
| 2017/0131506 A1 | 5/2017 | Cooke et al. |
| 2017/0153399 A1 | 6/2017 | Rodriguez |
| 2017/0153406 A1 | 6/2017 | Rodriguez |
| 2017/0192191 A1 | 7/2017 | Dagley et al. |
| 2017/0235073 A1 | 8/2017 | Ott et al. |
| 2017/0269318 A1 | 9/2017 | Giraud et al. |
| 2017/0315320 A1 | 11/2017 | Wells et al. |
| 2017/0315321 A1 | 11/2017 | Wells et al. |
| 2017/0343756 A1 | 11/2017 | Hsu et al. |
| 2018/0011275 A1 | 1/2018 | Fontaine |
| 2018/0129008 A1 | 5/2018 | Gonzalez Covarrubias et al. |
| 2019/0004268 A1 | 1/2019 | Vogel |
| 2019/0124421 A1 | 4/2019 | Rutz |
| 2021/0084788 A1 | 3/2021 | Smith et al. |

FOREIGN PATENT DOCUMENTS

| | | |
|---|---|---|
| CN | 101881870 B | 11/2011 |
| CN | 102870021 A | 1/2013 |
| CN | 202676965 U | 1/2013 |
| CN | 104049695 A | 9/2014 |
| CN | 204595292 U | 8/2015 |
| CN | 204903799 U | 12/2015 |
| CN | 205049782 U | 2/2016 |
| CN | 103777294 B | 5/2016 |
| CN | 205720798 U | 11/2016 |
| CN | 106199885 A | 12/2016 |
| CN | 205982753 U | 2/2017 |
| EP | 3001229 A1 | 3/2016 |
| EP | 2867712 B1 | 9/2019 |
| GB | 2536256 A | 9/2016 |
| JP | 3815606 B2 | 8/2006 |
| JP | 4039673 B2 | 1/2008 |
| JP | 4786294 B2 | 10/2011 |
| TW | M372950 U | 1/2010 |
| WO | WO2011/137350 A1 | 11/2011 |
| WO | WO2012/052332 A1 | 4/2012 |
| WO | WO2013/120270 A1 | 8/2013 |
| WO | WO2014/009344 A1 | 1/2014 |
| WO | WO2016/012550 A2 | 1/2016 |

(56) References Cited

FOREIGN PATENT DOCUMENTS

| WO | WO2016/142715 A1 | 9/2016 |
| WO | WO2016/154092 A1 | 9/2016 |
| WO | WO2017/021116 A1 | 2/2017 |
| WO | WO2017/103197 A1 | 6/2017 |
| WO | WO2017/103234 A1 | 6/2017 |
| WO | WO2017/184508 A1 | 10/2017 |

OTHER PUBLICATIONS

First Chinese Office Action Corresponding to Chinese Application 2019800013252 on Aug. 30, 2023.

* cited by examiner

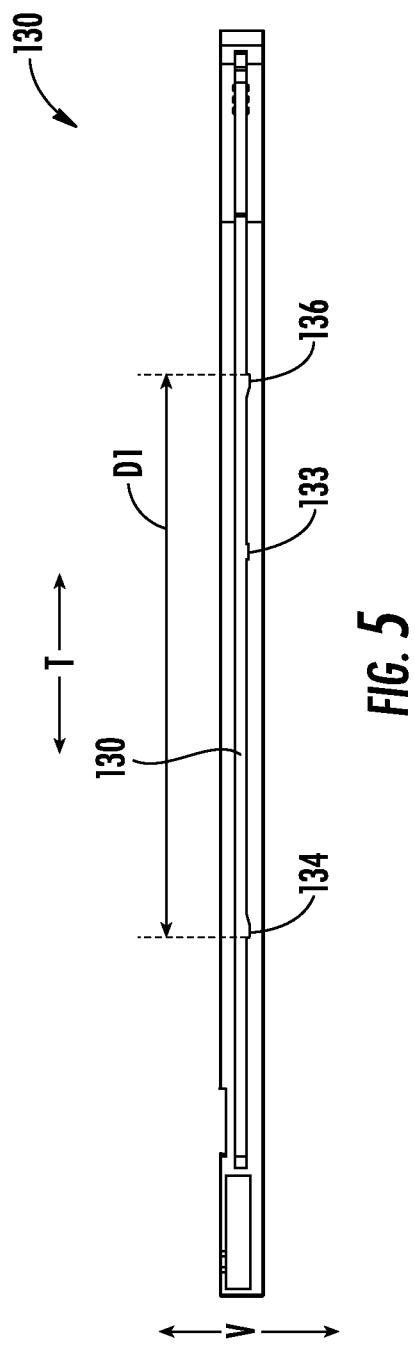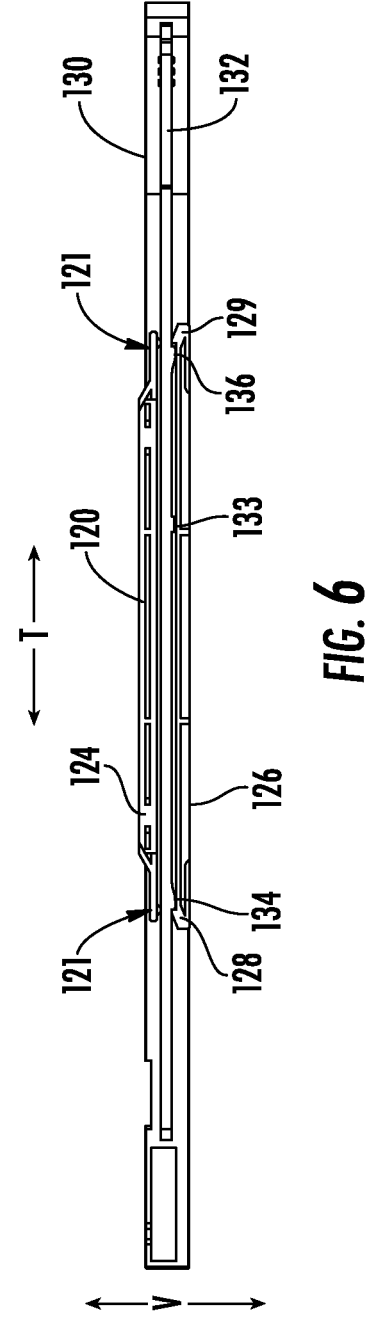

ured cassette modules installed in rack-mount enclosures. Although these pre-terminated cassettes have addressed many installation issues in terms of eliminating the need for field termination and polishing, they've introduced others. In particular, there are certain applications that require installation/maintenance from the rear side of the enclosure and others that lend to front-side installation/maintenance. Many enclosures in the market only allow either front side or rear side installation/maintenance; and, while there are a few solutions in the market that do allow for front and rear side access, the removal of the cassette module can be cumbersome in tight quarters.

PATCH PANEL WITH LIFTING CASSETTE REMOVAL

This application is a continuation of U.S. patent application Ser. No. 17/568,651, filed Jan. 4, 2022, which is a continuation of U.S. patent application Ser. No. 16/628,478, filed Jan. 3, 2020, which claims the benefit of priority to international patent application no. PCT/US2019/027892, filed on Apr. 17, 2019, the disclosures of which are incorporated by reference herein in their entirety.

FIELD OF THE INVENTION

The present subject matter relates generally to fiber optic patch panels or enclosures for pre-terminated cassette modules.

BACKGROUND OF THE INVENTION

Large data centers frequently deploy rows of racks and/or cabinets for cross-connect applications. The installation of high density fiber optic patch panels has been simplified and made more reliable by utilizing pre-terminated cassette modules installed in rack-mount enclosures. Although these pre-terminated cassettes have addressed many installation issues in terms of eliminating the need for field termination and polishing, they've introduced others. In particular, there are certain applications that require installation/maintenance from the rear side of the enclosure and others that lend to front-side installation/maintenance. Many enclosures in the market only allow either front side or rear side installation/maintenance; and, while there are a few solutions in the market that do allow for front and rear side access, the removal of the cassette module can be cumbersome in tight quarters.

BRIEF DESCRIPTION OF THE INVENTION

Aspects and advantages of the invention will be set forth in part in the following description, or may be apparent from the description, or may be learned through practice of the invention.

In a first example embodiment, a patch panel includes a cabinet and a cassette. A pair of cassette guides is positioned within the cabinet. The pair of cassette guides are spaced along a lateral direction such that the cassette is receivable between the pair of cassette guides. The cassette is slidable along a transverse direction on the pair of cassette guides. The transverse direction is perpendicular to the lateral direction. At least one of the pair of cassette guides includes a first rail and a second rail that are spaced apart along a vertical direction that is perpendicular to the lateral and transverse directions. The cassette is slidable along the transverse direction between the first and second rails. Each end of the first rail is cantilevered such that each end of the first rail is moveable along the vertical direction.

In a second example embodiment, a patch panel includes a cabinet and a cassette. A pair of cassette guides is positioned within the cabinet. The pair of cassette guides are spaced along a lateral direction such that the cassette is receivable between the pair of cassette guides. The cassette is slidable along a transverse direction on the pair of cassette guides. The transverse direction is perpendicular to the lateral direction. At least one of the pair of cassette guides includes a first rail and a second rail that are spaced apart along a vertical direction that is perpendicular to the lateral and transverse directions. The cassette is slidable along the transverse direction between the first and second rails. Each end of the first rail is cantilevered such that each end of the first rail is moveable along the vertical direction. Each end of the second rail is not cantilevered such that each end of the second rail is fixed along the vertical direction. The first rail is elastically deformable such that each end of the first rail is moveable along the vertical direction by no less than three millimeters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 5 is a side elevation view of a cassette of the example patch panel of FIG. 2.

FIG. 6 is a partial, side elevation view of the cassette of FIG. 5 shown in a retracted position within the cassette guide of FIG. 4.

DETAILED DESCRIPTION

Figure 1:
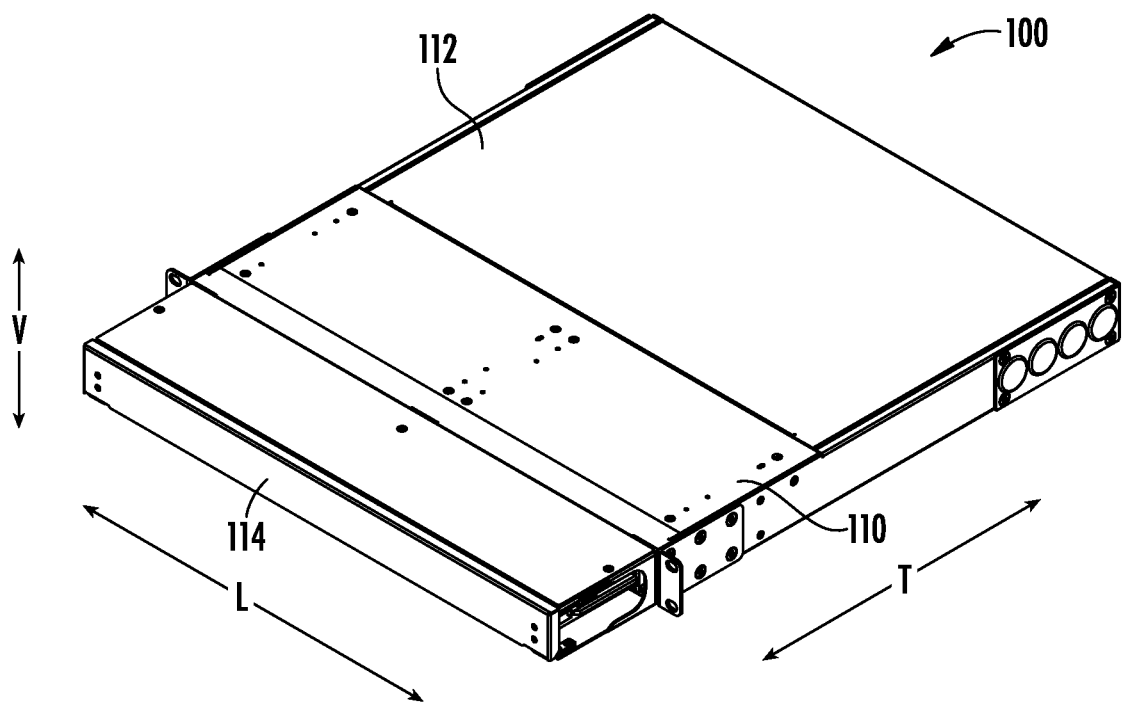
FIG. 1 is a perspective view of a patch panel according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
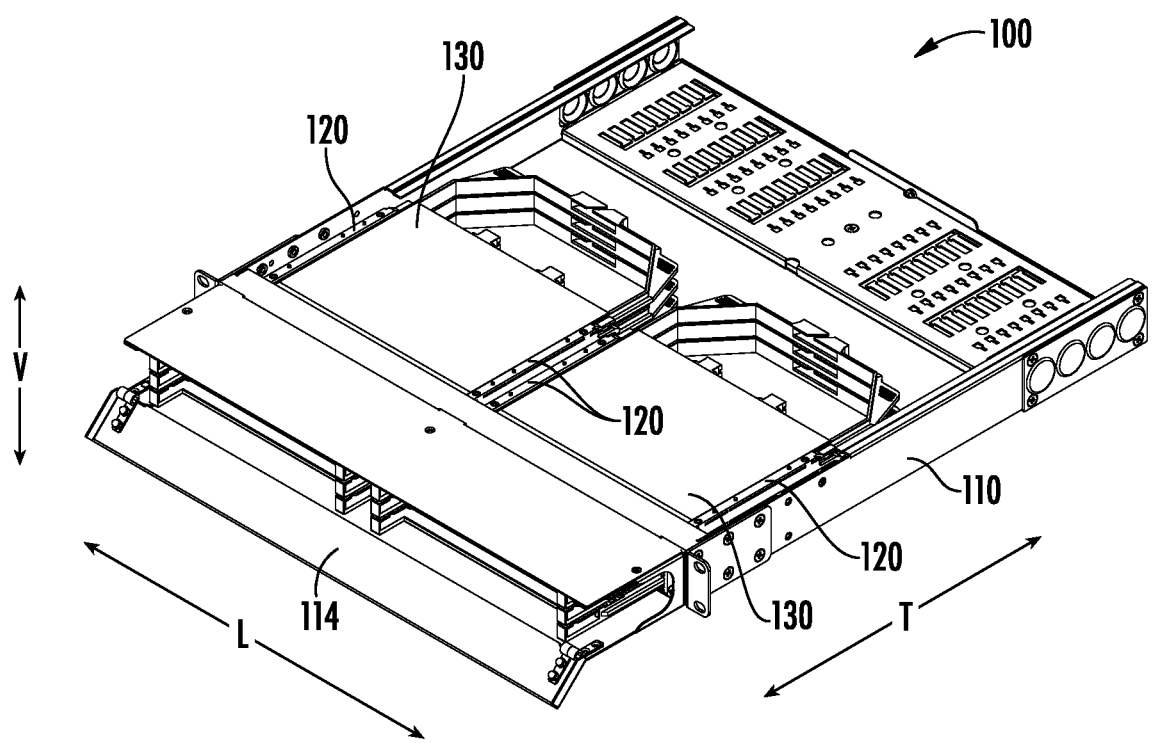
FIG. 2 is a perspective view of the example patch panel of FIG. 1 with a top cover of the patch panel removed and a front cover of the patch panel rotated open.
Figure 3:
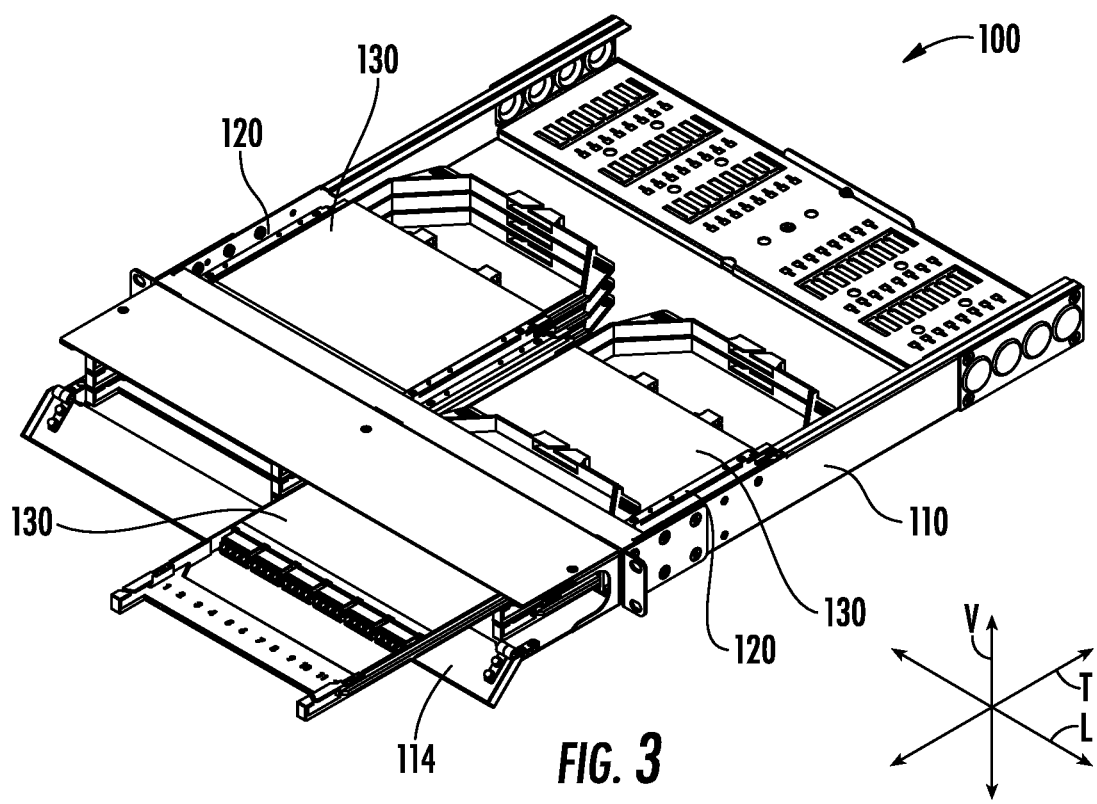
FIG. 3 is a perspective view of the example patch panel of FIG. 2 with a cassette of the patch panel shown in an extended positon.

FIGS. 1 through 3 are perspective views of a patch panel 100 according to an example embodiment of the present subject matter. As may be seen in FIG. 1, patch panel 100 includes a cabinet or enclosure 110. Enclosure 110 may include a top panel 112 and a front panel 114. With reference to FIGS. 1 and 2, top panel 112 is removable to facilitate access to components within enclosure 110, e.g., at the rear of enclosure 110. Similarly, front panel 114 is rotatable and may open and close. Thus, front panel 114 may facilitate access to components within enclosure 110, e.g., at the front of enclosure 110.

As may be seen in FIGS. 2 and 3, patch panel 100 includes a plurality of cassette guides 120 and a plurality of cassettes 130. Thus, e.g., one of ordinary skill in the art may refer to patch panel 100 as a "rackmount high density connectivity platform." Cassettes 130 may be modular and suitable for patch, patch & splice, wavelength-division-multiplexing (WDM), and splitter applications. Thus, e.g., each cassette 130 may include connectors (such as LC connectors, MPO connecters, etc.) at a front and a rear of the cassette 130, and fibers within the cassette 130 may extend between the various connectors at the front and rear of the cassette 130.

As discussed in greater detail below, patch panel 100 includes features for regulating movement of cassettes 130 on cassette guides 120. Such features may facilitate access to cassettes 130 and thereby assist a user with connecting optical fiber cables to cassettes 130. In particular, patch panel 100 defines a vertical direction V, a lateral direction L and a transverse direction T. The vertical, lateral and transverse directions V, L, T are mutually perpendicular and form an orthogonal direction system. Cassettes 130 may be mounted on cassette guides 120 within enclosure 110 such that cassettes 130 are slidable relative to cassette guides 120 along the transverse direction T. In particular, all of cassettes 130 are shown in a retracted position on cassette guides 120 in FIG. 2. Conversely, one of cassettes 130 is shown in an extend position on cassette guides 120 with the rest of cassettes 130 shown in the retracted position in FIG. 3. The extended position may facilitate access to perform moves, adds, and/or changes with front side patch cords.

Cassette guides 120 are positioned within enclosure 110. In certain example embodiments, cassette guides 120 are mounted within enclosure 110 such that cassette guides 120 are fixed relative to enclosure 110. For example, cassette guides 120 may be mounted to enclosure 110 with thermal staking, ultrasonically welding, adhesive, tape and/or fasteners. Thus, e.g., patch panel 100 may not include a tray or drawer for slidably mounting cassette guides 120 within enclosure 110. However, in alternative example embodiments, patch panel 100 may include a tray or drawer, and cassette guides 120 may be mounted on the tray or drawer such that cassette guides 120 are movable relative to enclosure 110, e.g., along the transverse direction T, on the tray or drawer.

In FIGS. 2 and 3, patch panel 100 is shown with four cassette guides 120 and six cassettes 130. The four cassette guides 120 support the six cassettes 130 in two columns within enclosure 110. It will be understood that, while shown in FIGS. 2 and 3 with four cassette guides 120 and six cassettes 130, the particular number of cassette guides 120 and cassettes 130 is provided by way of example only. In alternative example embodiments, patch panel 100 may include any suitable number of cassette guides 120 and cassettes 130 depending upon the particular application.

Figure 4:
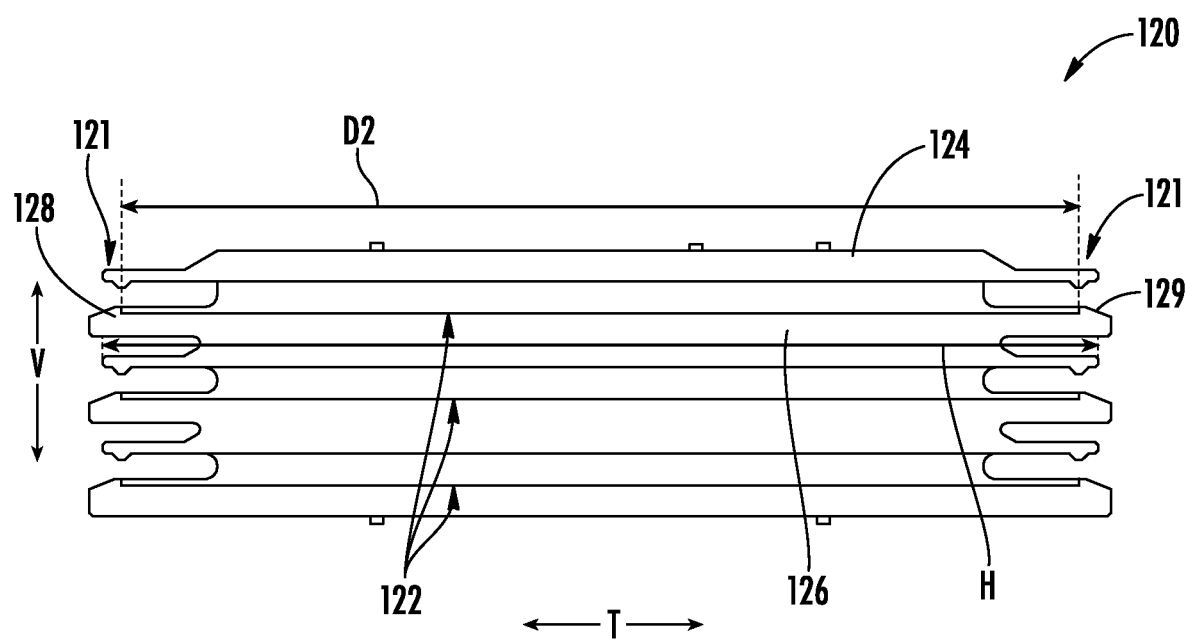
FIG. 4 is a side elevation view of a cassette guide of the example patch panel of FIG. 2.

Each cassette 130 may be slidable between two cassette guides 120. Thus, e.g., cassette guides 120 may be spaced along the lateral direction L within enclosure 110, and cassettes 130 may be receivable between cassette guides 120, e.g., along the lateral direction L. Cassette guides 120 and cassettes 130 are described in greater detail below in the context of FIGS. 4 through 6. In FIGS. 4 through 6, a single cassette guide 120 and cassette 130 are shown and described for the sake of brevity. However, as noted above, patch panel 100 may include multiple cassette guides 120 and cassettes 130. Each cassette guide 120 and/or cassette 130 of patch panel 100 may be configured and/or constructed in the same or similar manner to that described below.

FIG. 4 is a side elevation view of a cassette guide 120; FIG. 5 is a side elevation view of a cassette 130; and FIG. 6 is a partial, side elevation view of the cassette 130 arranged in a retracted position within the cassette guide 120. As may be seen in FIG. 4, each cassette guide 120 may define three mounting bays 122 that are stacked along the vertical direction V. Each mounting bay 122 may support a respective cassette 130. Thus, as noted above, three cassettes 130 may be stacked along the vertical direction V within mounting bays 122 on each cassette guide 120.

As shown in FIG. 4, cassette guide 120 includes a first rail 124 and a second rail 126. First and second rails 124, 126 define a respective one of mounting bays 122. While only two rails 124, 126 are described herein, it will be understood that cassette guide 120 may include other rails (not labeled) that define the other two mounting bays 122, as shown in FIG. 4. Such other rails may be formed in the same or similar manner to that described below for first and second rails 124, 126 but are not described in greater detail below for the sake of brevity.

First rail 124 and second rail 126 are spaced apart along the vertical direction V. Thus, cassette 130 is receivable between first and second rails 124, 126, as shown in FIG. 6. In particular, cassette 130 is slidable along the transverse direction T between first and second rails 124, 126. Thus, first rail 124 and second rail 126 may be spaced apart along the vertical direction V such that a side of cassette 130 may positioned between first and second rails 124, 126 and cassette 130 may slide along the transverse direction T relative to cassette guide 120. Cassette guides 120 may be, e.g., molded, plastic cassette guides in certain example embodiments. Thus, each cassette guide 120 may be a separate, discrete piece of plastic.

With reference to FIGS. 4 through 6, cassette guide 120 and cassette 130 include features for locking cassette 130 in a retracted or installed position (shown in FIG. 6) on cassette guide 120. As shown in FIG. 4, each end 121 of first rail 124 is cantilevered. By being cantilevered, each end 121 of first rail 124 may be moveable along the vertical direction V. The ends 121 of first rail 124 may move along the vertical direction V to unlock cassette 130 from the retracted position on cassette guide 120 and allow cassette 130 to slide along the transverse direction T into an extended position (shown in FIG. 3) and/or allow cassette 130 to be removed from cassette guide 120 along the transverse direction T, as described in greater detail below. Each end of second rail 126 may not be cantilevered, e.g., such that each end of second rail 126 is fixed along the vertical direction V.

First rail 124 may be elastically deformable to allow the ends 121 of first rail 124 may move along the vertical direction V to a suitable degree. For example, first rail 124 may be elastically deformable such that each end 121 of first rail 124 is moveable along the vertical direction V by no less than three millimeters (3 mm). Thus, cassette guide 120 (e.g., first rail 124) may be constructed of a material with a suitable modulus of elasticity, such as a plastic, and/or a length of the portion of first rail 124 that is cantilevered may be no less than twelve millimeters (12 mm). Such features may advantageously allow selective locking of cassette 130 in the retracted position on cassette guide 120.

Turning to FIG. 5, cassette 130 may include a slide rail 132. Slide rail 132 is positioned on a side of cassette 130 and is receivable between first and second rails 124, 126 of cassette guide 120. In particular, slide rail 132 of cassette 130 may cooperate with first and second rails 124, 126 of cassette guide 120 to allow cassette 130 to slide along the transverse direction T relative to cassette guide 120. Cassette 130 may include another slide rail on the opposite side of cassette 130 that is constructed in the same or similar manner to that described below for slide rail 132.

As shown in FIG. 4, second rail 126 may include a first projection 128 and a second projection 129. First and second projections 128, 129 of second rail 126 may be spaced apart, e.g., along the transverse direction T, on second rail 126. Turning back to FIG. 5, slide rail 132 may include a first projection 134 and a second projection 136. First and second projections 134, 136 of slide rail 132 may be spaced apart, e.g., along the transverse direction T, on slide rail 132.

The projections 128, 129, 134, 136 may cooperate to lock cassette 130 in the retracted position on cassette guide 120. In particular, first projection 134 of slide rail 132 may be positioned against first projection 128 of second rail 126 when cassette 130 is in the retracted positon on cassette guide 120. Similarly, second projection 136 of slide rail 132 may be positioned against second projection 129 of second rail 126 when cassette 130 is in the retracted positon on cassette guide 120. Interference between first projection 134 of slide rail 132 and first projection 128 of second rail 126 as well as interference between second projection 136 of slide rail 132 and second projection 129 of second rail 126 may block movement of cassette 130 along the transverse direction T relative to cassette guide 120 when cassette 130 is in the retracted positon on cassette guide 120, e.g., and the cantilevered ends 121 of first rail 124 limit upward movement of slide rail 132.

First projection 134 of slide rail 132 may be spaced from second projection 136 of slide rail 132 by a first distance D1, e.g., along the transverse direction T, as shown in FIG. 5. Conversely, first projection 128 of second rail 126 may be spaced from second projection 129 of second rail 126 by a second distance D2, e.g., along the transverse direction T, as shown in FIG. 4. The first distance D1 may be less than the second distance D2. Thus, first and second projections 134, 136 of slide rail 132 may be positioned between first and second projections 128, 129 of second rail 126, e.g., along the transverse direction T, when cassette 130 is in the retracted positon on cassette guide 120. Such positioning may advantageously facilitate selective locking of cassette 130 in the retracted position on cassette guide 120, e.g., by allowing cassette 130 to be lifted upwardly along the vertical direction V to permit cassette 130 to slide along the transverse direction T relative to cassette guide 120.

As shown in FIG. 4, each end 121 of first rail 124 may be cantilevered such that each end 121 of first rail 124 extends over a respective one of first and second projections 128, 129 of second rail 126, e.g., along the transverse direction T. In addition, first rail 124 may define a length H, e.g., along the transverse direction T between the ends 121 of first rail 124. First projection 134 of slide rail 132 may also be spaced from second projection 136 of slide rail 132 by a gap G (i.e., the first distance D1 shown in FIG. 5), e.g., along the transverse direction T. The length H of first rail 124 may be no less than five millimeters (5 mm) greater than the gap G between first and second projections 134, 136 of slide rail 132. Such sizing may advantageously allow the cantilevered ends 121 of first rail 124 to assist with locking cassette 130 in the retracted position on cassette guide 120.

Figure 13:
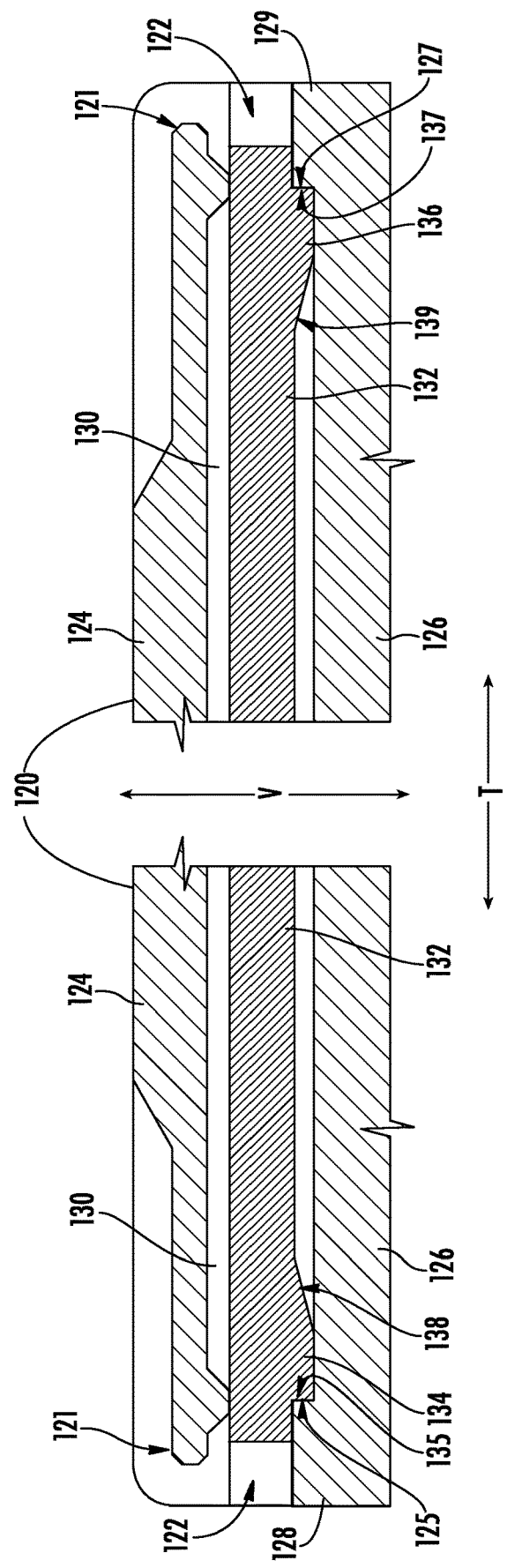
FIG. 13 is a partial, side elevation view of the cassette and cassette guide of FIG. 6.

FIG. 13 is a partial, side elevation view of cassette 130 and cassette guide 120. As shown in FIG. 13, first projection 134 of slide rail 132 includes a planar locking surface 135. Similarly, second projection 136 of slide rail 132 includes a planar locking surface 137. Planar locking surfaces 135, 137 of slide rail 132 may be oriented perpendicular to the transverse direction T. Planar locking surface 135 of first projection 134 of slide rail 132 may also face away from planar locking surface 137 of second projection 136 of slide rail 132, e.g., along the transverse direction T.

As shown in FIG. 13, first projection 128 of second rail 126 may also include a planar locking surface 125, and second projection 129 of second rail 126 may also include a planar locking surface 127. Planar locking surfaces 125, 127 of second rail 126 may be oriented perpendicular to the transverse direction T. Planar locking surface 125 of first projection 128 of second rail 126 may face towards planar locking surface 127 of second projection 129 of second rail 126, e.g., along the transverse direction T.

Planar locking surface 135 of first projection 134 of slide rail 132 may be positioned on or against planar locking surface 125 of first projection 128 of second rail 126 when cassette 130 is in the retracted positon on cassette guide 120. Similarly, planar locking surface 137 of second projection 136 of slide rail 132 may be positioned on or against planar locking surface 127 of second projection 129 of second rail 126 when cassette 130 is in the retracted positon on cassette guide 120. In such a manner, planar locking surfaces 135, 137 of slide rail 132 may cooperate with planar locking surfaces 125, 127 of second rail 126 to lock cassette 130 is in the retracted positon on cassette guide 120, e.g., due to interference at the interfaces.

As shown in FIG. 13, first projection 134 of slide rail 132 also includes a sloped surface 138. Similarly, second projection 136 of slide rail 132 includes a sloped surface 139. Sloped surface 138 of first projection 134 of slide rail 132 may be positioned opposite planar locking surface 135 of first projection 134 of slide rail 132, e.g., along the transverse direction T. Similarly, sloped surface 139 of second projection 136 of slide rail 132 may be positioned opposite planar locking surface 137 of second projection 136 of slide rail 132, e.g., along the transverse direction T.

Turning back to FIG. 5, slide rail 132 may further include a stop tab 133. Stop tab 133 may be positioned between first and second projections 134, 136 of slide rail 132, e.g., along the transverse direction T. Stop tab 133 may have planar locking surfaces (not labeled) formed in the same or similar manner to planar locking surfaces 135, 137 of slide rail 132. Stop tab 133 may engage first and second projections 134, 136 of slide rail 132 to limit translation of cassette 130, e.g., along the transverse direction T, as discussed in greater detail below.

Figure 11:
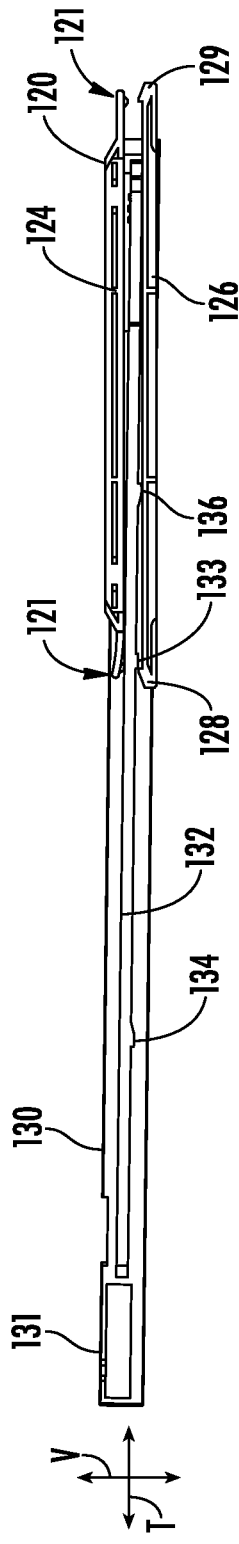
Figure 12:
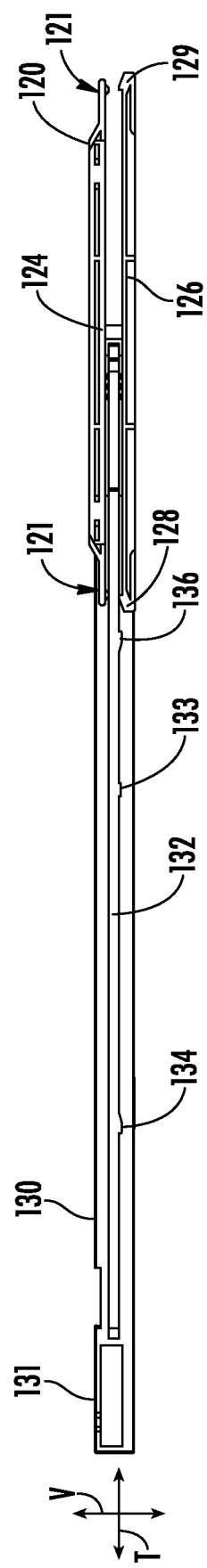

Each end 121 of first rail 124 may be moveable along the vertical direction V to permit cassette 130 to be inserted into or removed from between first and second rails 124, 126 on cassette guide 120. FIGS. 7 through 12 are side elevation views of cassette 130 and cassette guide 120 in various stages of shifting from the retracted position (FIG. 7) to the extended positon (FIG. 10) to fully removed (FIG. 12). Example steps for moving cassette 130 along the transverse direction T relative to cassette guide 120 will now be described in greater detail below in the context of FIGS. 7 through 12.

Figure 7:
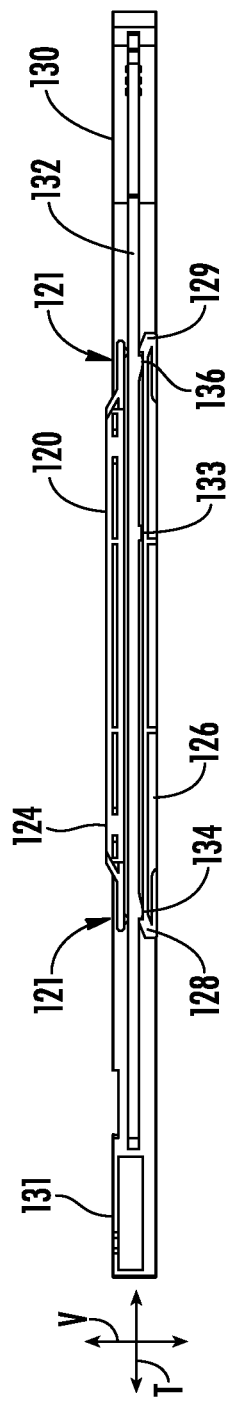
FIGS. 7 through 12 are partial, side elevation views of the cassette and cassette guide of FIG. 6 in various stages of shifting from the retracted position to the extended positon.

In FIG. 7, cassette 130 is shown in the retracted position on cassette guide 120. The retracted position may correspond to the position of cassette 130 on cassette guide 120 in which cassette 130 is locked within a mounting bay 122 (FIG. 3). Thus, e.g., interference between first projection 134 of slide rail 132 and first projection 128 of second rail 126 as well as interference between second projection 136 of slide rail 132 and second projection 129 of second rail 126 may block movement of cassette 130 along the transverse direction T relative to cassette guide 120 when cassette 130 is in the retracted positon on cassette guide 120.

Figure 8:
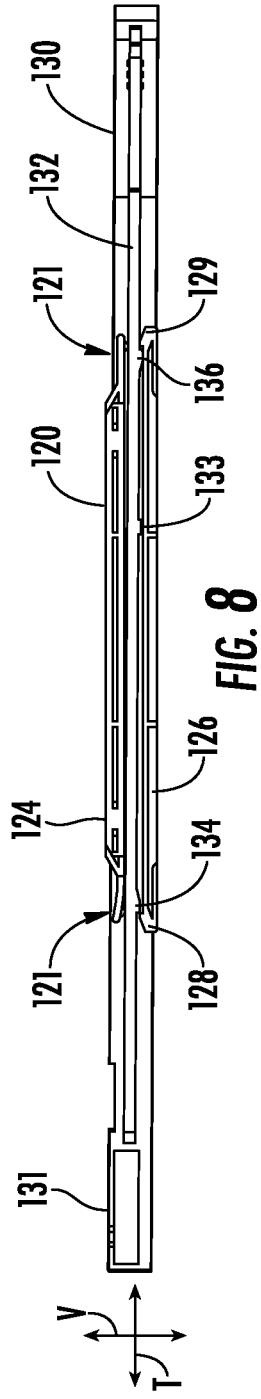

A user of patch panel 100 may desire to shift cassette 130 to the extended positon (FIG. 10) and/or to fully remove cassette 130 from cassette guide 120 (FIG. 12). To allow movement of cassette 130 along the transverse direction T relative to cassette guide 120, i.e., out of the retracted position shown in FIG. 7, the user may move a handle 131 of cassette 130, e.g., upwardly along the vertical direction V. By lifting handle 131 of cassette 130 as shown in FIG. 8, one end 121 of first rail 124 may elastically deform and move, e.g., along the vertical direction V. Such movement of first rail 124 may assist with disengaging first projection 134 of slide rail 132 from first projection 128 of second rail 126. In particular, planar locking surface 135 (FIG. 13) of first projection 134 of slide rail 132 may be spaced from planar locking surface 125 (FIG. 13) of first projection 128 of second rail 126 along the vertical direction V by lifting upwardly on handle 131 of cassette 130 and elastically deforming first rail 124. Thus, elastic deformation of first rail 124 may allow first projection 134 of slide rail 132 to disengage from first projection 128 of second rail 126 by moving upwardly along the vertical direction V.

Figure 9:
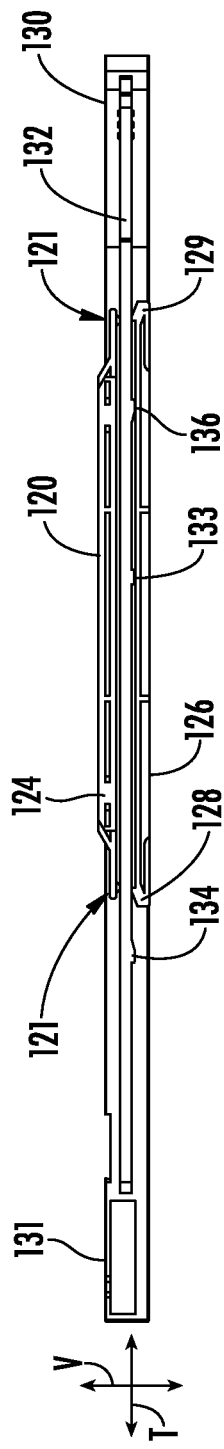

From the arrangement shown in FIG. 8, the user may pull on handle 131 of cassette 130 to move cassette 130, e.g., along the transverse direction T, relative to cassette guide 120. Thus, as shown in FIG. 9, first projection 134 of slide rail 132 may move to the opposite side of first projection 128 of second rail 126 relative to the arrangement shown in FIGS. 7 and 8. The user may continue to pull on handle 131 of cassette 130 to move cassette 130, e.g., along the transverse direction T, relative to cassette guide 120.

Figure 10:
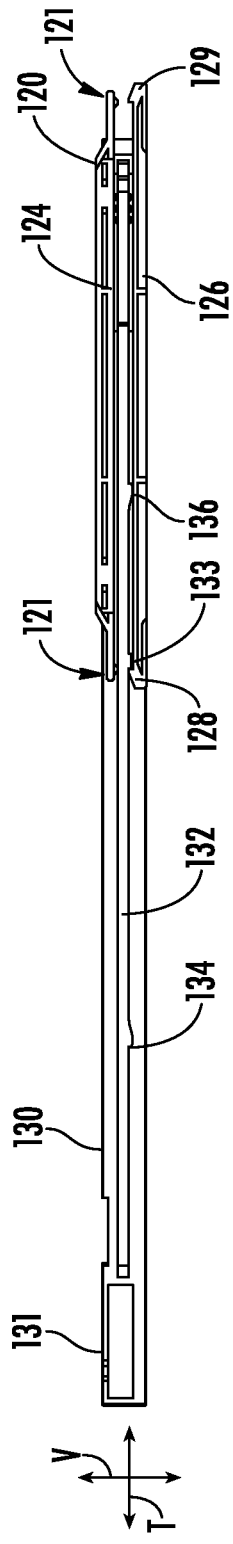

Turning to FIG. 10, stop tab 133 may impact first projection 128 of second rail 126 as the user continues to pull on handle 131 of cassette 130. Interference between stop tab 133 and first projection 128 of second rail 126 may block further movement of cassette 130 along the transverse direction T relative to cassette guide 120. Thus, as shown in FIG. 11, the user may again move handle 131 of cassette 130, e.g., upwardly along the vertical direction V. By lifting handle 131 of cassette 130 as shown in FIG. 11, the one end 121 of first rail 124 may elastically deform and move, e.g., along the vertical direction V. Such movement of first rail 124 may assist with disengaging stop tab 133 from first projection 128 of second rail 126.

From the arrangement shown in FIG. 11, the user may pull on handle 131 of cassette 130 to move cassette 130, e.g., along the transverse direction T, relative to cassette guide 120. As shown in FIG. 12, stop tab 133 may move to the opposite side of first projection 128 of second rail 126 relative to the arrangement shown in FIGS. 10 and 11. When second projection 136 of slide rail 132 impacts against first projection 128 of second rail 126, sloped surface 139 of second projection 136 of slide rail 132 may automatically allow second projection 136 of slide rail 132 to slide over first projection 128 of second rail 126, e.g., without requiring the user to lift upwardly on handle 131 of cassette 130. The user may continue to pull on handle 131 of cassette 130 to fully remove cassette 130 from cassette guide 120.

It will be understood that the steps described above may be reversed to insert cassette 130 into cassette guide 120. However, the sloped surface (not labeled) on first projection 128 of second rail 126 may automatically allow first and second projections 134, 136 of slide rail 132 to slide over first projection 128 of second rail 126, e.g., without requiring the user to lift upwardly on handle 131 of cassette 130. In addition, while described above in the context of removing cassette 130 from a front of cassette guide 120, the same or similar process may be used to remove cassette 130 from a rear of cassette guide 120.

Figure 14:
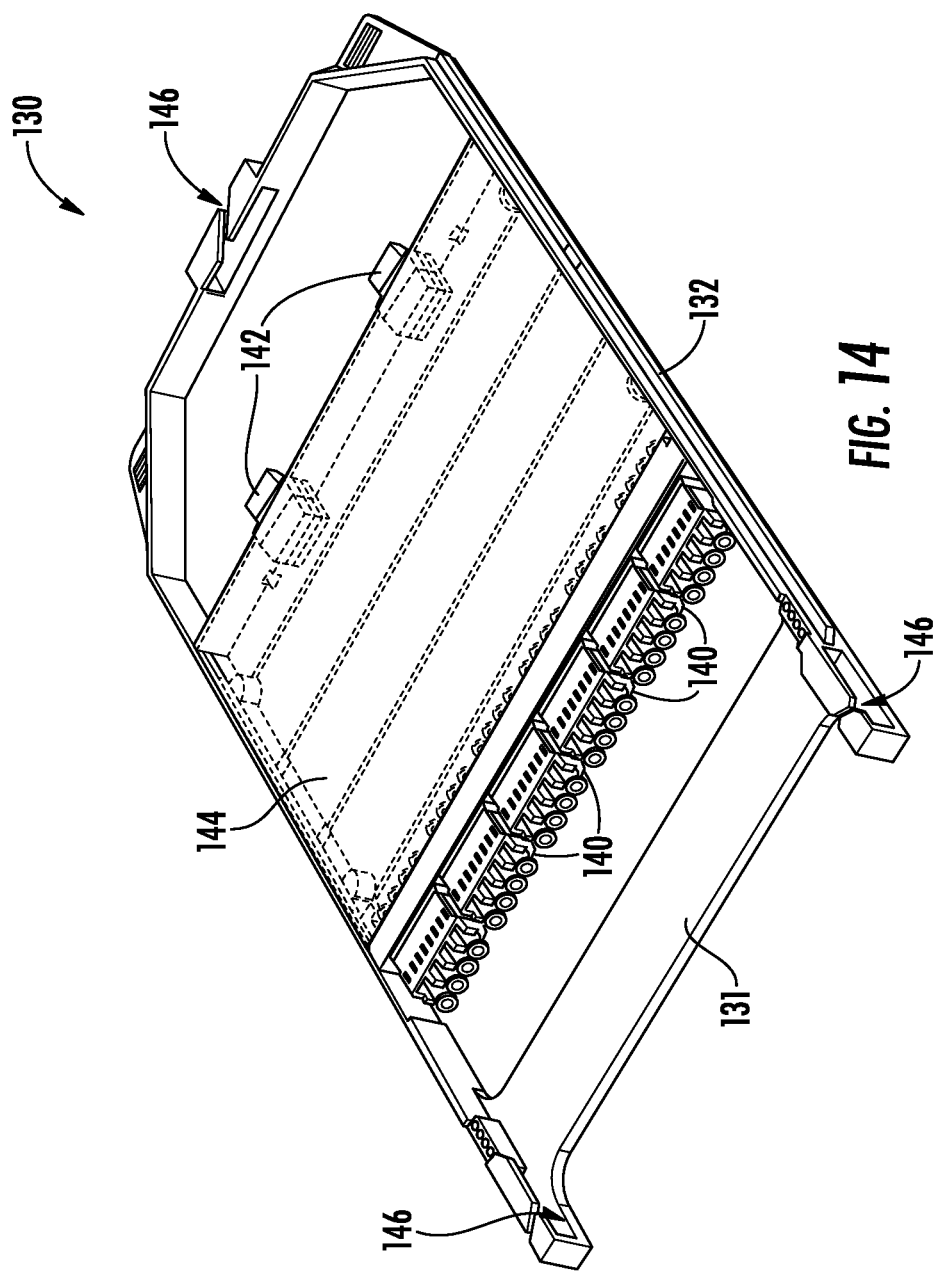
FIG. 14 is a perspective view of the cassette of FIG. 5.

FIG. 14 is a perspective view of cassette 130. As shown in FIG. 14, cassette 130 may include front adapters 140 and rear adapters 142 positioned at opposite ends of cassette 130. Cassette 130 may also include a transparent cover 144 that protects optical fibers (not shown) within cassette 130 while also allowing viewing of the optical fibers through the transparent cover 144. Fiber management slots 146 may be formed at the front and rear of cassette 130.

Figure 15:
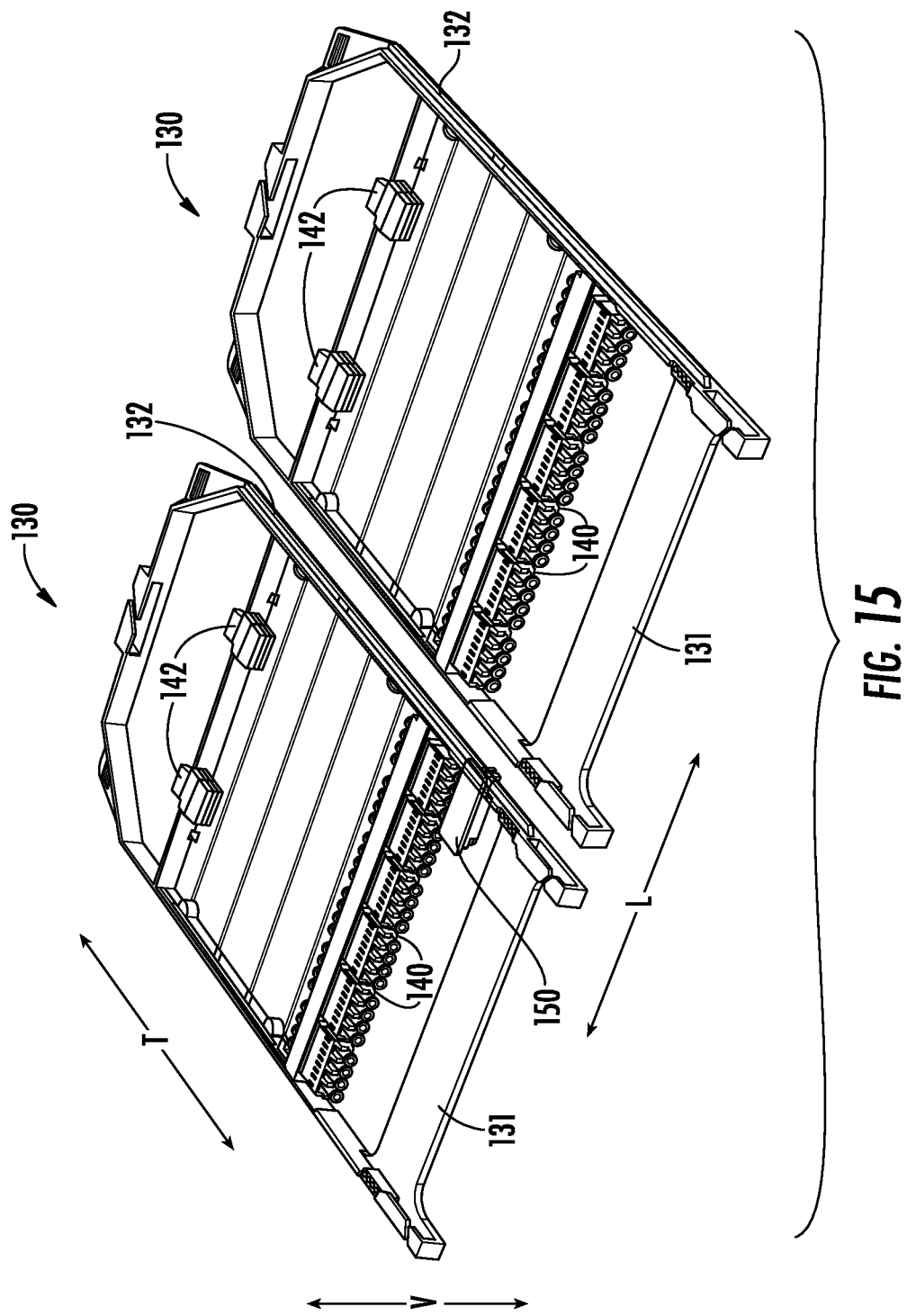
FIG. 15 is a perspective view of a pair of cassettes and a bridging connector of the example patch panel of FIG. 2.

FIG. 15 is a perspective view of a pair of cassettes 130 and a bridging connector 150. Bridging connector 150 may extend between and connect two adjacent cassettes 130, e.g., along the lateral direction L. Bridging connector 150 may couple the two cassettes 130 such that movement of cassettes 130, e.g., along the transverse direction T, is transferred between the two cassettes 130 via bridging connector 150.

The present subject matter has numerous advantages over known high density fiber optic patch panels for pre-terminated cassette modules. For example, cassettes 130 may be installed and removed by single-hand manipulation for both front and rear install/release scenarios.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A patch panel, comprising:
    a cabinet, the cabinet comprising a moveable front panel and top panel each configured to facilitate access within the cabinet;
    a pair of cassette guides positioned within the cabinet, wherein at least one of the pair of cassette guides comprises a first rail and a second rail that are spaced apart along a vertical direction that is perpendicular to a lateral direction and a transverse direction perpendicular to the lateral direction, the pair of cassette guides spaced along a lateral direction; and
    a cassette receivable between the pair of cassette guides, the cassette slidable on the pair of cassette guides along the transverse direction, the cassette comprising a fiber optic connector at a front and a rear of the cassette.

2. The patch panel of claim 1, wherein the pair of cassette guides is mounted within the cabinet such that the pair of cassette guides are substantially fixed directly to the cabinet.

3. The patch panel of claim 1, the cassette comprising a transparent cover extending between a pair of slide rails at the cassette.

4. The patch panel of claim 3, the transparent cover extending between the fiber optic connectors at the front and the rear of the cassette.

5. The patch panel of claim 1, the cassette comprising a fiber management slot formed at the front of the cassette forward of the fiber optic connector at the front of the cassette.

6. The patch panel of claim 1, the cassette comprising a fiber management slot formed at the rear of the cassette aft of the fiber optic connector at the rear.

7. The patch panel of claim 1, the cassette comprising a bridging connector extending between and connecting two adjacent cassettes along the lateral direction.

8. The patch panel of claim 1, the cassette comprising a handle extending forward of the fiber optic connector at the front.

9. The patch panel of claim 1, wherein one or more ends of the first rail is moveable along the vertical direction.

10. The patch panel of claim 1, wherein each end of the first rail is moveable along the vertical direction to permit the cassette to be inserted into or removed from between the first and second rails.

11. The patch panel of claim 1, wherein the second rail comprises a first projection and a second projection spaced apart along the transverse direction, and wherein the cassette comprises a slide rail receivable between the first and second rails, the slide rail comprising a first projection and a second projection spaced apart along the transverse direction.

12. The patch panel of claim 11, wherein:
the first projection of the slide rail is spaced from the second projection of the slide rail by a first distance along the transverse direction; and
the first projection of the second rail is spaced from the second projection of the second rail by a second distance along the transverse direction.

13. The patch panel of claim 12, wherein the first distance is less than the second distance.

14. The patch panel of claim 12, wherein:
each of the first and second projections of the slide rail comprises a respective planar locking surface that is oriented perpendicular to the transverse direction; and
each of the first and second projections of the second rail comprises a respective planar locking surface that is oriented perpendicular to the transverse direction.

15. The patch panel of claim 14, wherein the planar locking surface of the first projection of the slide rail faces away from the planar locking surface of the second projection of the slide rail along the transverse direction, and wherein the planar locking surface of the first projection of the second rail faces towards the planar locking surface of the second projection of the second rail along the transverse direction.

16. The patch panel of claim 15, wherein each of the first and second projections of the slide rail comprises a respective sloped surface.

17. The patch panel of claim 16, wherein the sloped surface of the first projection of the slide rail is positioned opposite the planar locking surface of the first projection of the slide rail along the transverse direction.

18. The patch panel of claim 17, wherein the sloped surface of the second projection of the slide rail is positioned opposite the planar locking surface of the second projection of the slide rail along the transverse direction.

19. The patch panel of claim 14, wherein the slide rail comprises a stop tab positioned between the first and second projections of the slide rail along the transverse direction.

20. The patch panel of claim 14, wherein each end of the first rail is cantilevered such that each end of the first rail extends over a respective one of the first and second projections of the second rail along the transverse direction.

* * * * *